May 29, 1928.

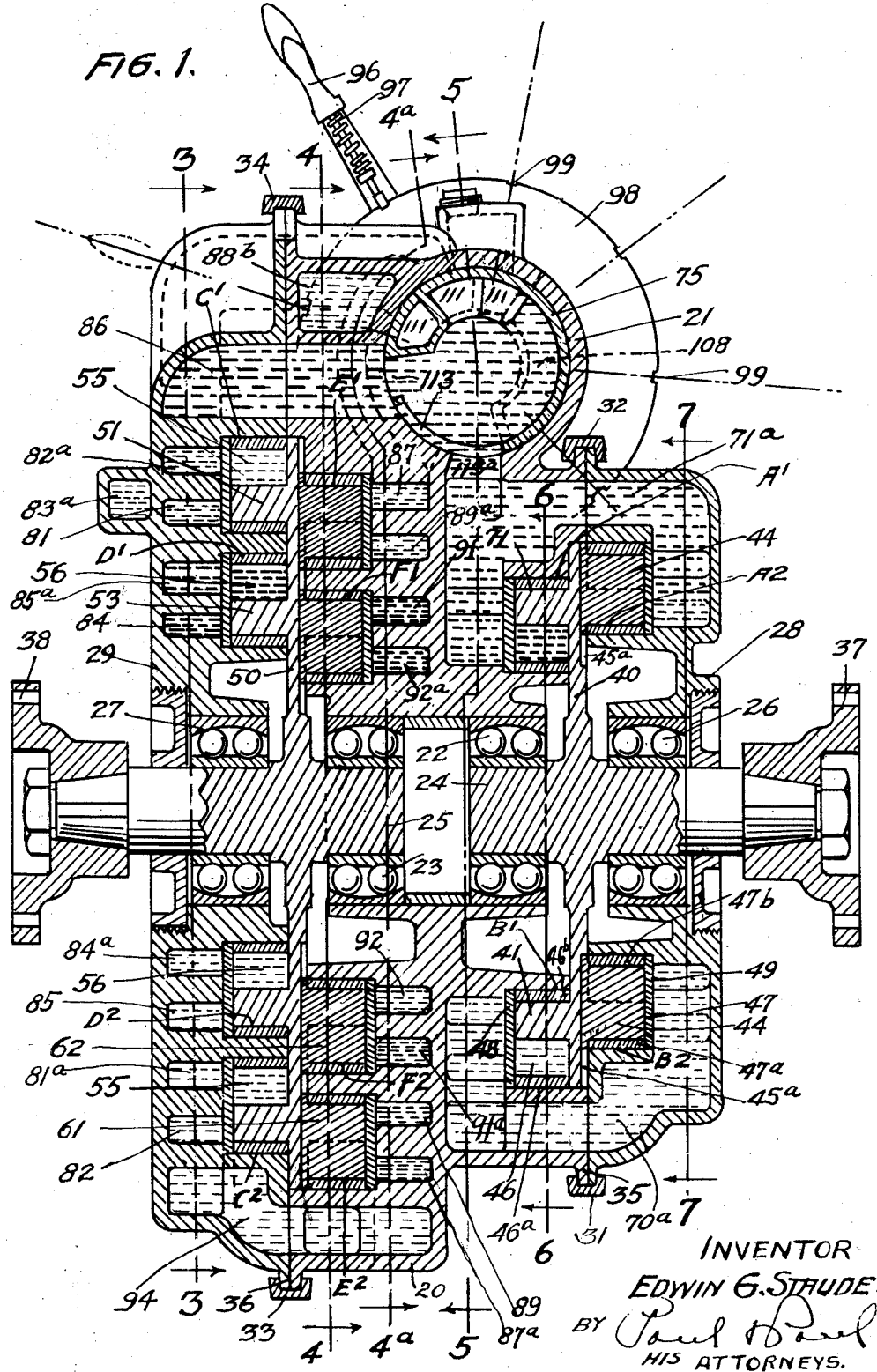

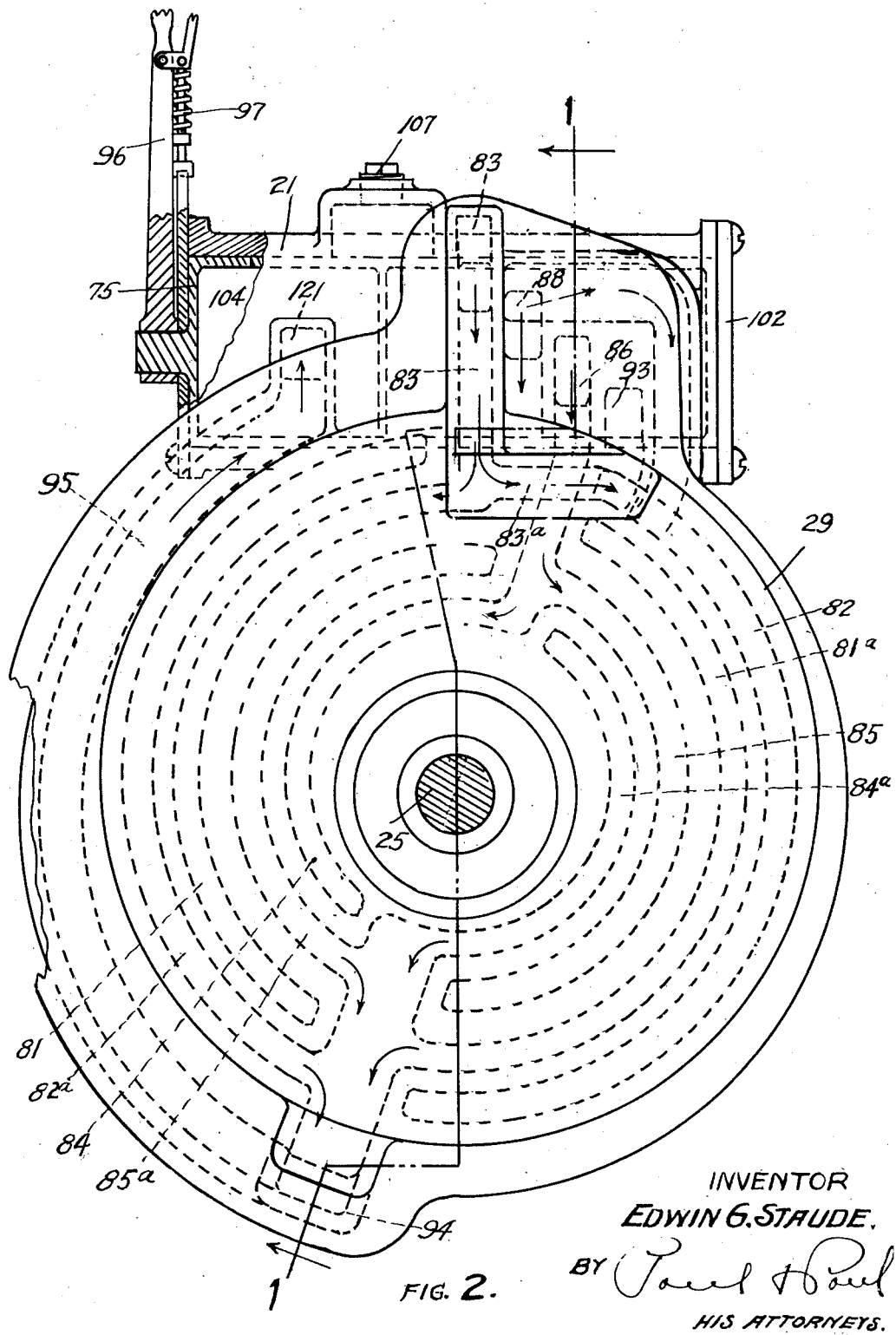

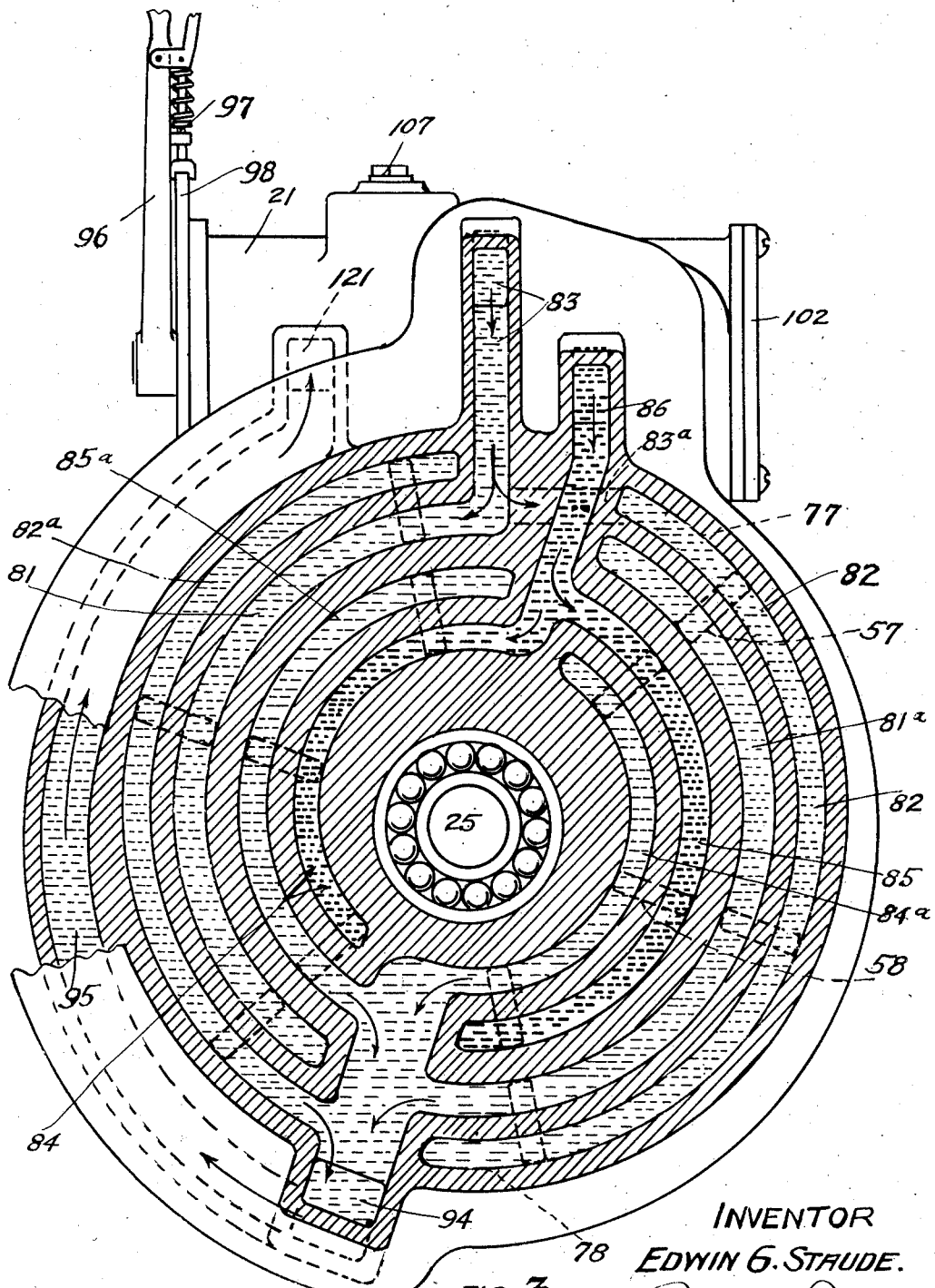

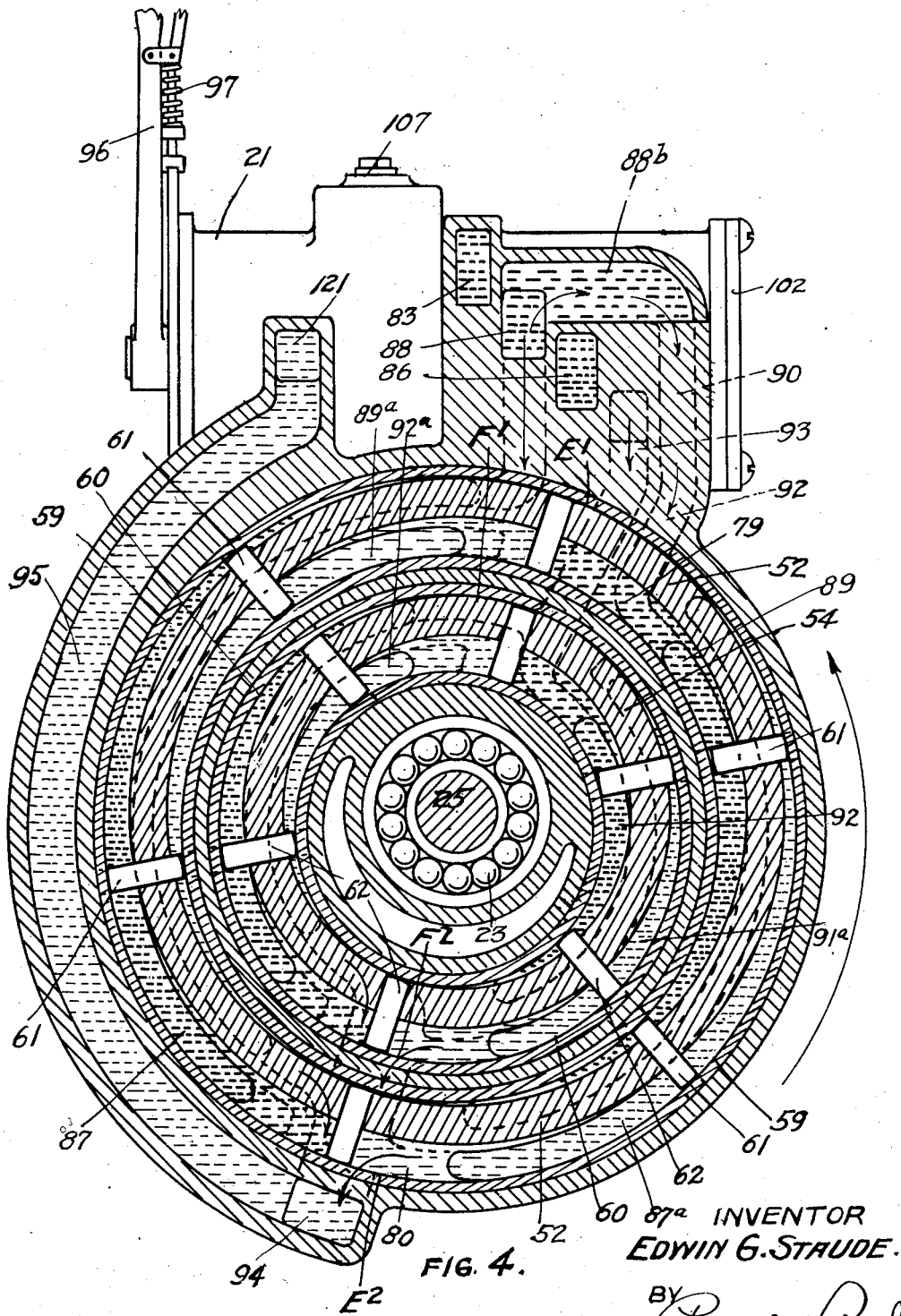

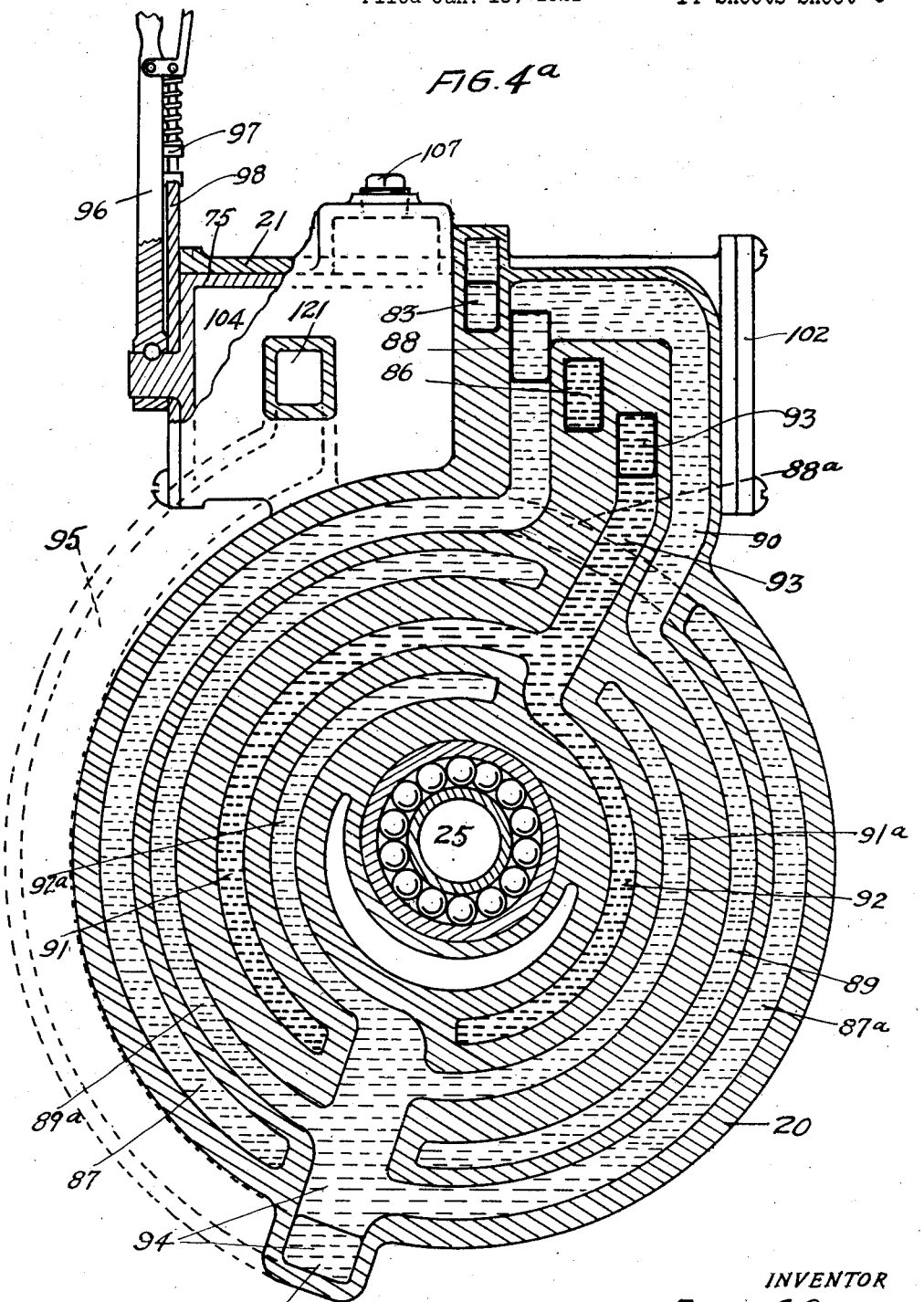

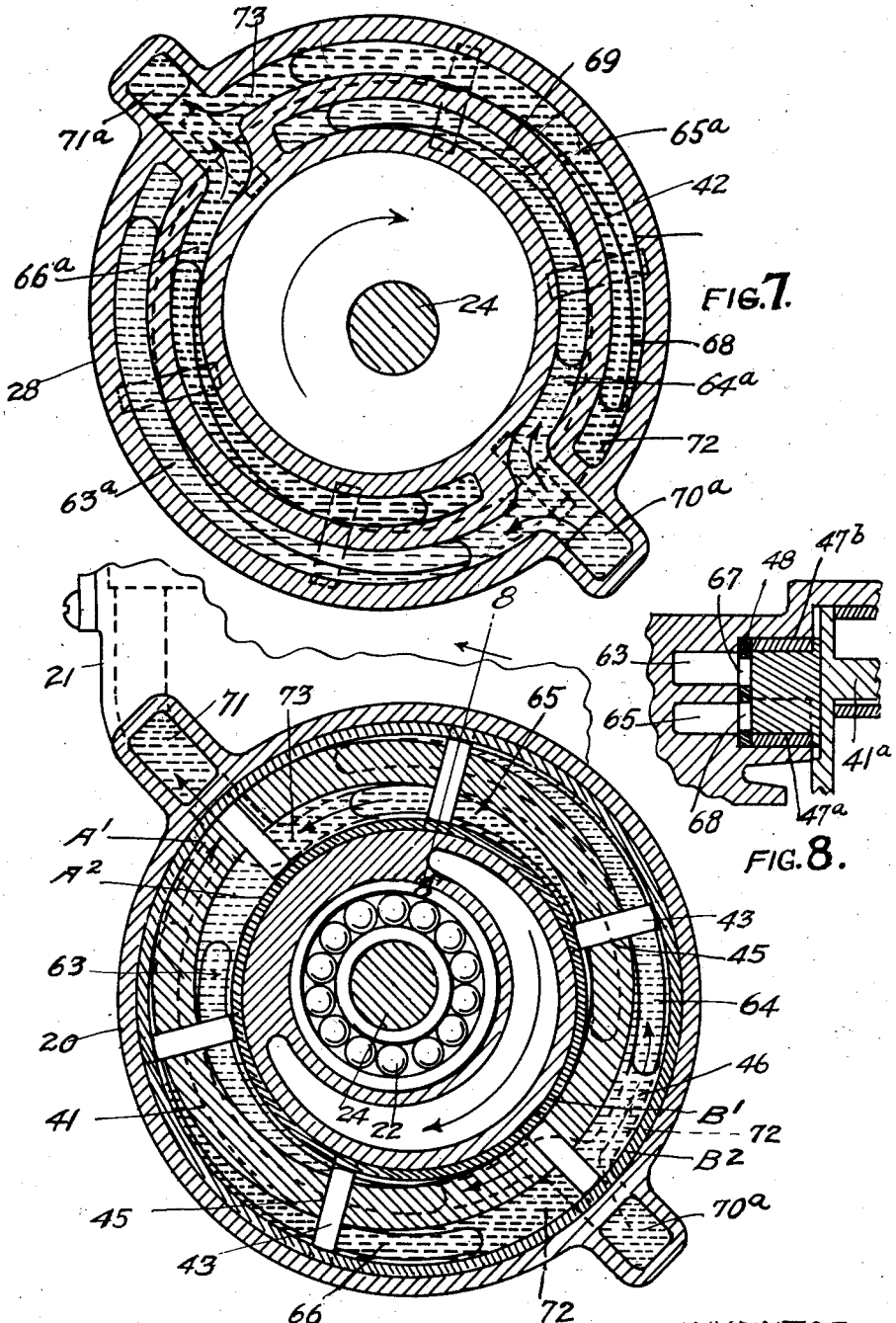

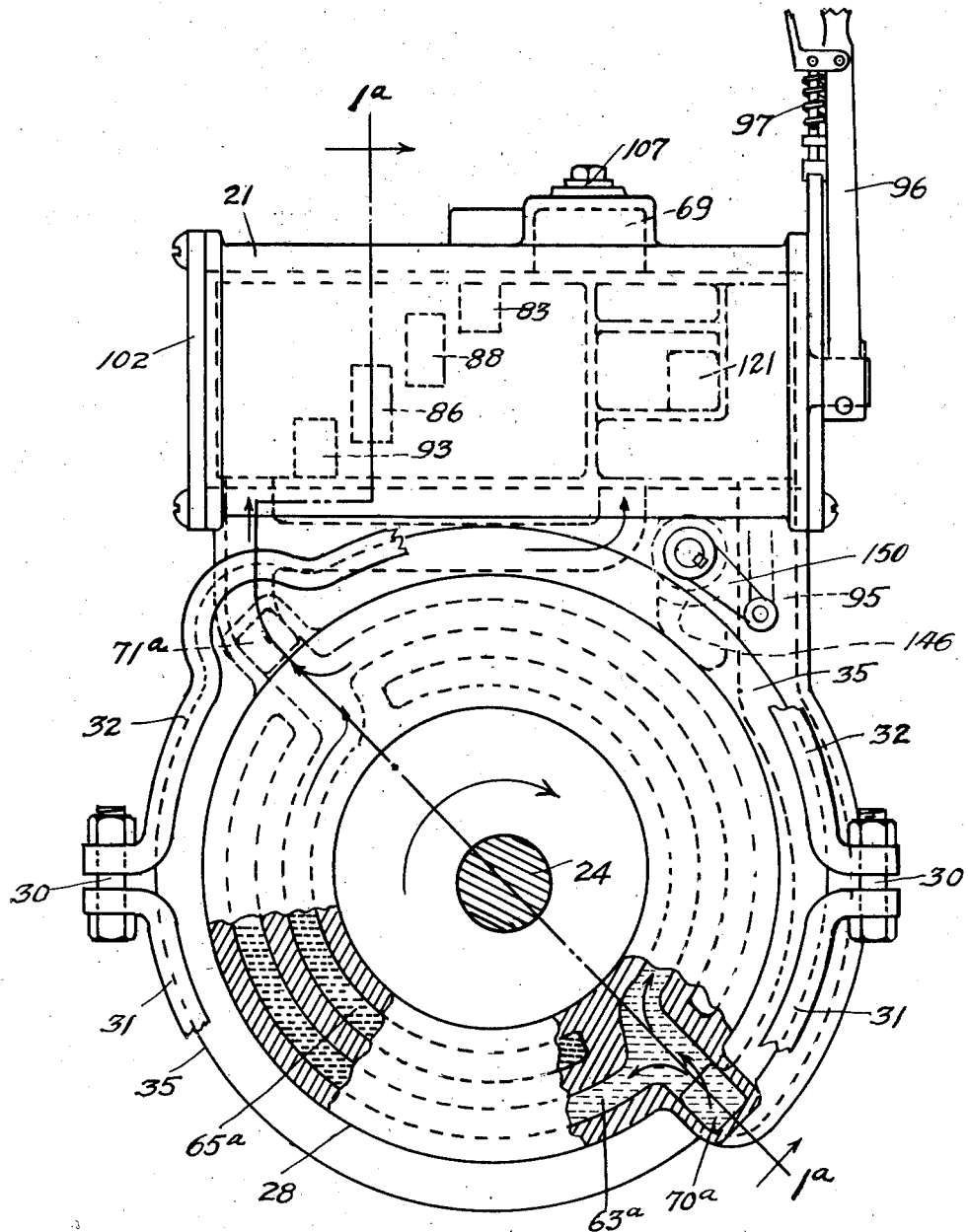

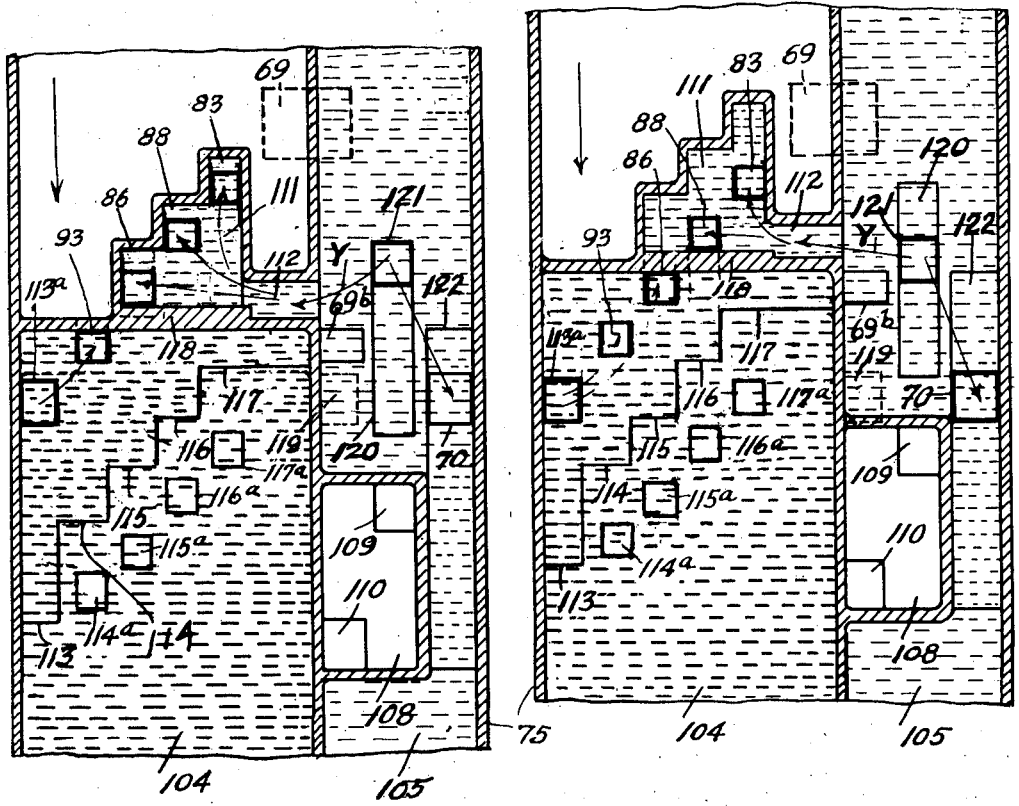

E. G. STAUDE 1,671,750

VARIABLE SPEED FLUID TRANSMISSION

Filed Jan. 15, 1921 14 Sheets-Sheet 10

SECOND SPEED

LOW SPEED

INVENTOR
EDWIN G. STAUDE.

BY

ATTORNEYS.

May 29, 1928.

E. G. STAUDE 1,671,750

VARIABLE SPEED FLUID TRANSMISSION

Filed Jan. 15, 1921    14 Sheets-Sheet 11

INVENTOR
EDWIN G. STAUDE.

BY
HIS ATTORNEYS.

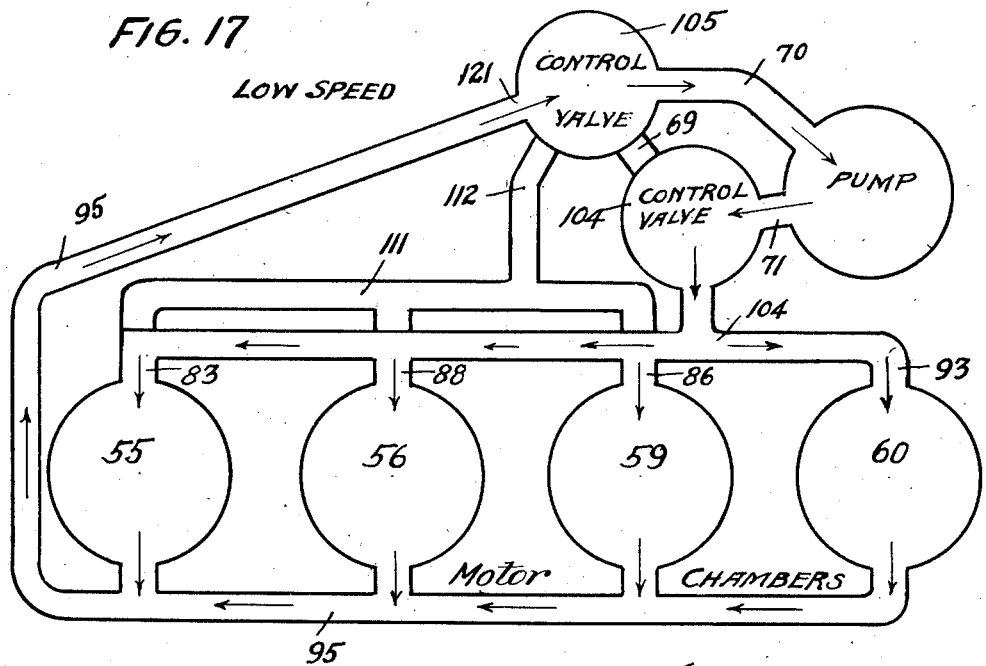
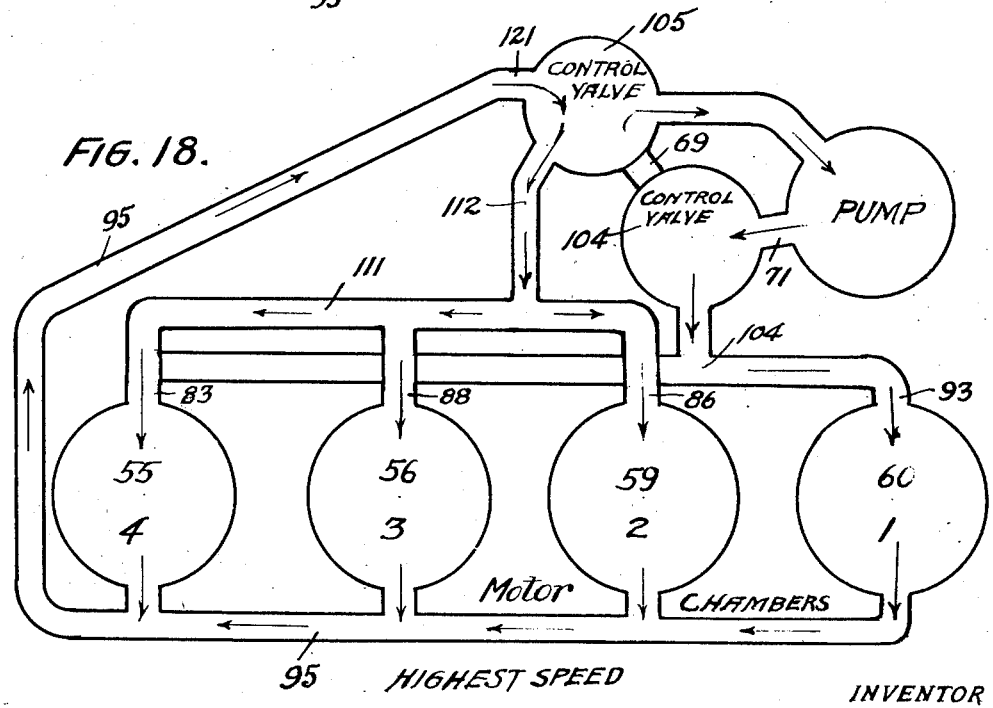

May 29, 1928.
E. G. STAUDE
1,671,750
VARIABLE SPEED FLUID TRANSMISSION
Filed Jan. 15, 1921
14 Sheets-Sheet 13
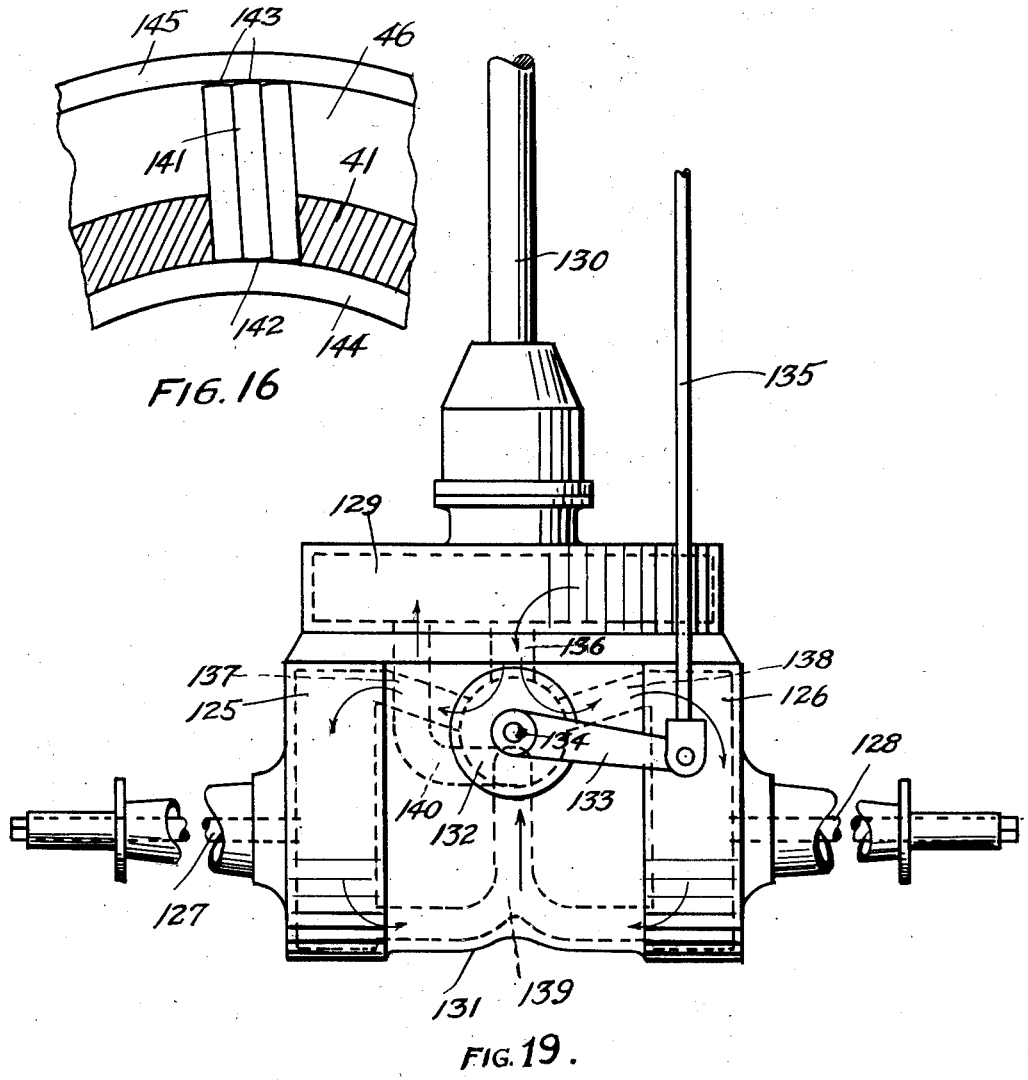
INVENTOR
EDWIN G. STAUDE.
BY
HIS ATTORNEYS.

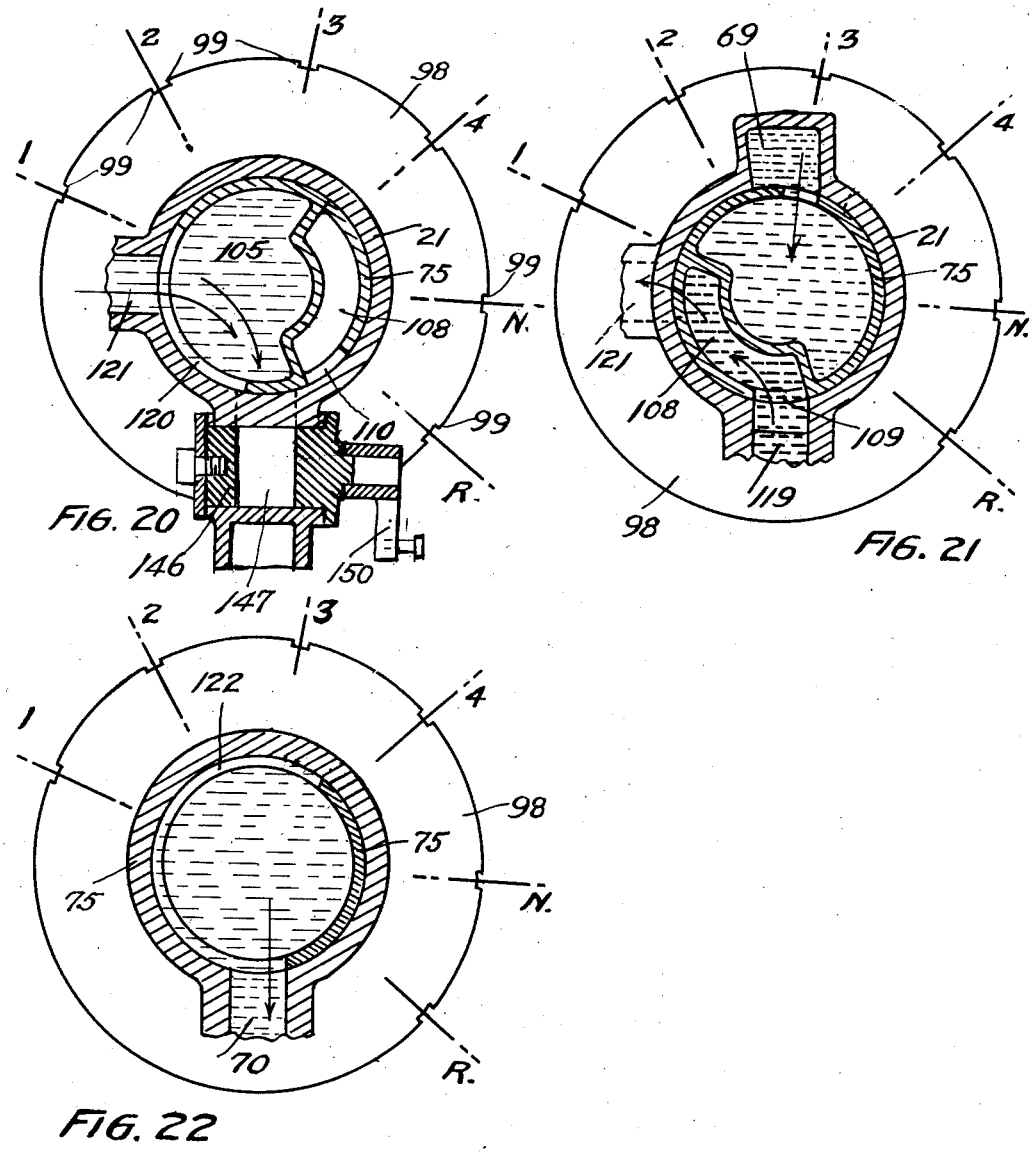

Patented May 29, 1928.

1,671,750

UNITED STATES PATENT OFFICE.

EDWIN G. STAUDE, OF MINNEAPOLIS, MINNESOTA.

VARIABLE-SPEED FLUID TRANSMISSION.

Application filed January 15, 1921. Serial No. 437,628.

Variable speed transmissions using a fluid transmission medium are of two general classes, namely: transmission pumps having variable piston travel and transmission pumps of the by-pass type. In the first-named class it is necessary to move the primary piston-actuating member together with the transmitted load by manual or mechanical power whenever travel of the pistons is to be varied, and this fact makes this type impractical for general service on account of the complicated and expensive mechanism needed for effecting the variable piston throw for anything more than light transmission of power. For automotive service especially it is essential in order to preserve light weight and compactness of the transmission, to use very high pressure in both the pump and motor and this fact particularly precludes the use of this type of fluid transmission for this class of work.

The by-pass type of variable speed transmission does not require piston travel adjustment but variation in speed is effected by passing or diverting, by some means, a variable amount of the fluid traveling under constant pressure from the pump to the motor back to the driving pump chamber before entering the motor. This method, although simple, has not the advantage of the first method of a proportionately increased torque transmission with diminishing speed and vice versa, but the torque remains constant during variations of speed and the original pressure of the driving fluid returned to the pump, is released and dissipated in the by-pass resulting in a low efficiency and loss of power.

In the construction of my improved rotary pump device, I have maintained the advantages of the proportional variable torque of the first method of transmission and the simplicity and ease of operation of the second method. I am also able to reverse the rotation of the driven member and to stop it at will without decreasing the speed of the pump. I furthermore obtain these results at a low pump pressure and with a minimum of friction, since a further feature of my invention consists in properly balancing the pressure so that the rotors in both the pump and motor are not subjected to any pressure which will be exerted against the bearings, other than their weight, as I am able to equalize the pressure on opposite sides of the rotors.

The driving rotor is quite similar in construction to that shown in my patent for "fluid actuating brakes for vehicles" Number 1,514,804 of November 11th, 1920, except that in the present application I use several blades, whereas in my former application, I make use of a small hollow cylinder for this purpose.

A further advantage of my improved fluid transmission device is that I am able to control all of the speeds of the motor, by the adjustment to different positions of a single valve.

My invention consists in certain constructions and combinations, all as hereinafter described and particularly pointed out in the claims, taken with reference to the accompanying drawings, in which—

Figure 1 is a section through a transmission device embodying my invention, the section being taken on the line 1—1 of Figure 2, and 1ª 1ª of Figure 9;

Figure 2 is an end elevation of the device, looking from the left hand side of Figure 1;

Figure 3 is a cross section on the line 3—3 of Figure 1;

Figure 4 is a cross section on the line 4—4 of Figure 1;

Figure 5:
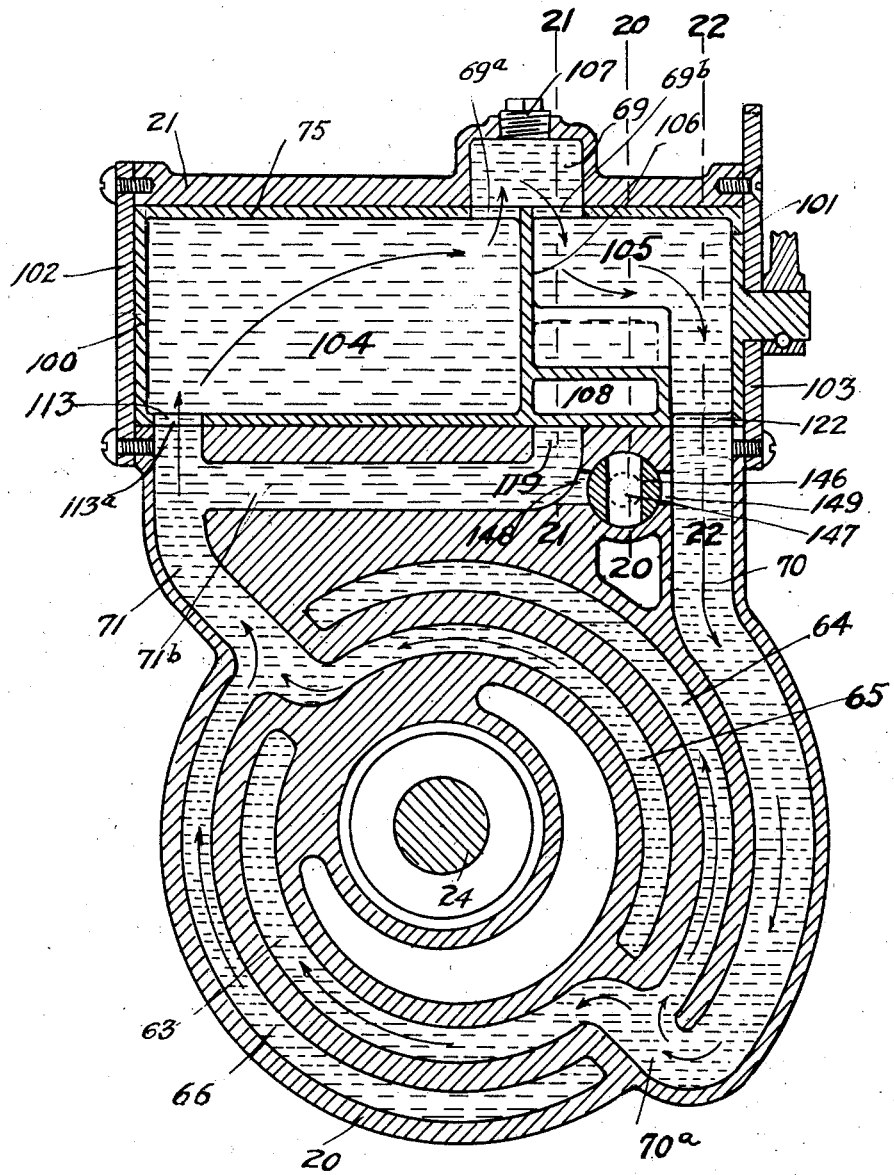
Figure 12:
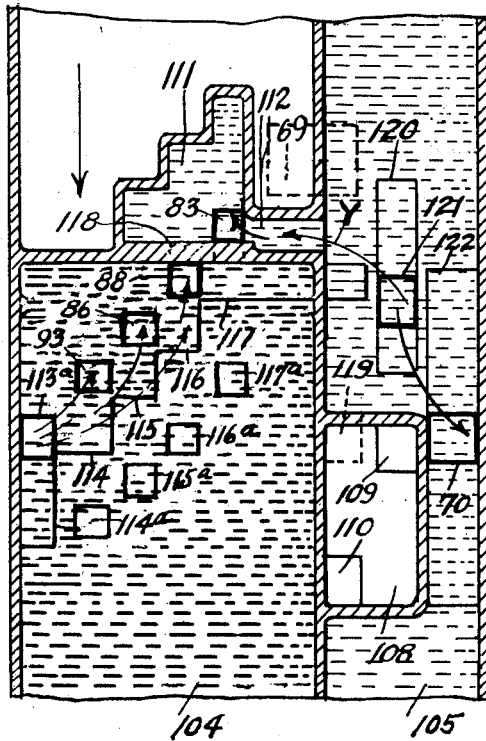
Figure 13:
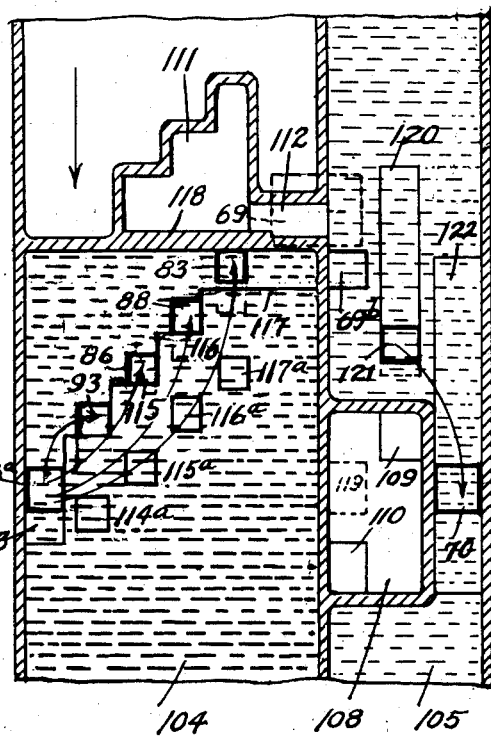

Figure 4ª is a cross section on the line 4ª—4ª of Figure 1;

Figure 5 is a cross section on the line 5—5 of Figure 1;

Figure 6 is a cross section on the line 6—6 of Figure 1;

Figure 7 is a cross section on the line 7—7 of Figure 1;

Figure 8 is a detail view of a section of the pump chambers and ports on section 8—8 of Figure 6;

Figure 9 is an elevation of the device looking from the right hand side in Figure 1, the casing being partially broken away;

Figures 10, 11, 12, 13, 14 and 15 are illustrative developed views of the controlling valves in the different positions and showing the means for controlling the flow of the fluid;

Figure 16 is a detail view of parts of the rotors;

Figures 17 and 18 are diagrammatical views illustrating the circulation of the fluid through the rotors and valve;

Figure 19 is a plan view of a modified form of the device, showing how my invention may be applied in a single unit to embody the desirable features of a variable speed fluid transmission and in addition have the compensating features of the ordinary compensating gears used in automobile axles;

Figure 20 is a section through the controlling valve on the line 20—20 of Figure 5;

Figures 21 and 22 are similar sections on the lines 21—21 and 22—22 respectively of the same figure.

Referring to Figure 1, I prefer for the purpose of convenient manufacture to construct the transmission housing or casing in three parts, of which the central housing 20, having the valve casing 21 and suitable antifriction inner bearings 22 and 23 for the pump or driving rotor shaft 24 and driven rotor shaft 25 respectively, constitutes the main supporting part. The opposite or outer bearings 26 and 27 for the shafts 24 and 25 are arranged in the head casings 28 and 29 which constitute auxiliary parts and are attached to the central housing 20, preferably by means of clamping bolts 30 (see Figure 9) and clamp rings 31, 32, 33 and 34, U-shaped in section, and fitting around suitable tapered flanges 35 and 36.

The pump rotor shaft 24 is provided with a flange coupling 37 by which the rotor shaft may be driven from a suitable motor or other source of power and the transmission rotor shaft 25 likewise carries a similar coupling 38 to which may be coupled a transmission shaft or other suitable transmission means. The power or pump rotor disc 40 may be formed integral with the shaft 24, as shown, or secured rigidly thereto by any suitable means, and is provided near its periphery and on opposite sides thereof with annular flanges 41 and 42 (see also Figures 6 and 7). A series of rectangular blades 43 and 44 are slidably arranged in slots 45 milled out in the flanges 41 and 42 respectively. The rotor disc 40 is arranged at the joint-line of the central housing 20 and the end or head casing 28, the flange 41 projecting into the housing 20 and the opposite flange 42 projecting into the head casing 28. The housing 20 and casing 28 are bored to form annular ways or chambers 46 and 47 that are eccentric to the rotor shaft 24, the centers of the circles of the chambers 46 and 47 preferably being on opposite sides of the axis of the shaft 24. Hardened steel rings or bushings 46$^a$ and 46$^b$ are arranged respectively in the outer and inner walls of the chamber 46 and suitable bushings 47$^a$ and 47$^b$ are similarly provided in the chamber 47. I also prefer to provide flat hardened steel rings 48 and 49 in the bottom of the chambers 46 and 47 respectively, by which in connection with the bushings above-mentioned, hardened steel lined eccentric annular slideways are provided for the pistons 43 and 44. As the rotor disc 40 rotates, the blades supported in the slots 45 are forced to move radially by the eccentricity of the annular ways of the chambers 46 and 47 and the blades are further guided in their radial movement by radial grooves 45$^a$ milled in the disc 40 as a prolongation of the slots 45.

The construction of the driven or motor rotor mounted upon the shaft 25 is substantially identical in detail with that of the pump rotor, except that the rotor disc 50 is provided with two additional annular flanges 51 and 52 (see Figure 4) on opposite sides of the disc and of greater diameter than the inner flanges 53 and 54 (see also Figure 4) which preferably have a slightly less diameter than the power rotor flanges 41 and 42. The rotor disc 50 is arranged substantially on the dividing line of the central housing 20 and the head casing 29 and annular eccentric chambers 55 and 56 having hardened steel lining rings similar to the rings in the chambers 46 and 47, are formed in the head casing 29 for the blades 57 and 58 supported by and operating in the flanges 51 and 53 respectively (see Figure 3). Similar annular eccentric chambers 59 and 60 having annular slideways are formed in the central housing 20 for the blades 61 and 62 supported by and operating in the flanges 52 and 54 respectively. The eccentric throw of the blades is balanced in this as in the pump rotor by arranging the centers of the annular ways in the head casings and central housing on opposite sides of the axis of the rotor shaft. All the blade carrying flanges are of less radial thickness than the radial width of the chamber or slide-way into which they project, the difference being exactly measured by the degree of eccentricity of the annular ways to the shafts 24 and 25 so that the flanges will touch the outer walls of the ways on one side and the inner walls of the ways on the opposite side of the shafts 24 and 25, thus making tight or sealed sliding connections between the flanges and walls eccentric to the shafts and forming inner and outer semi-annular pump chambers through which the blades pass. While I have shown the annular chambers substantially circular in form and eccentric to the shafts 24 and 25, in practice I finish the inner surface of the outer slideway ring concentric to the shafts for a short arc of the circle extending on both sides of the theoretical meeting point of the flanges and slideways and similarly the outer surface of the inner slideway rings are finished for a short arc of the circle concentric to the shafts 24 and 25, the concentric arc extending on both sides of the meeting point of the flanges and slideway rings. On opposite sides of these concentric arcs or seals, which I have denominated $A^1$—$A^2$ and $B^1$—$B^2$ in the pump unit, and $C^1$—$C^2$ and $D^1$—$D^2$, $E^1$—$E^2$ and $F^1$—$F^2$ in the motor unit, are located the inlet and outlet ports for the various pump and motor chambers, and radial thereto the bridges or abuttals separating the pressure from the discharge sides of the pump and motor.

Referring to Figures 5 to 8 and the pump section of Figure 1, semi-annular inlet channels 63 and 64 (see Figure 5) are arranged in the housing 20 adjacent the pump chamber 46, and pressure channels $63^a$ and $64^a$ are similarly arranged with respect to said chamber. These channels extend from the concentric arcs $A^1$—$A^2$ to the arcs $B^1$—$B^2$ and communicate with the chamber 46 through slots 67 and 68 in the bottom rings 48, as shown in Figure 8. It will be understood that these slots are provided in all the bottom rings of the various pump chambers and only the channels to which they lead from the pump chamber are hereinafter referred to.

It will be understood also that the details of construction of the pump and motor parts on opposite sides of the rotor discs 40 and 50 are substantially identical and that the double pumping unit construction in the pump rotor is principally for the purpose of balance and increased capacity and that therefore only the pumping unit on one side of the rotor disc 40 need be described in detail, the identical operating elements on the outer side of the rotor disc being denominated on the drawings with the same reference numerals, with the addition of the letter "a".

The inlet port 70 to both sides of the power rotor communicate with the channels 63 and 64 and $63^a$ and $64^a$ through a cross port $70^a$, and the outlet port 71 is connected to the pressure channels 65 and 66 and $65^a$ and $66^a$ through a cross port $71^a$. Opposite the concentric arcs A′ and B′ the bridges or abuttals 72 and 73 are formed in the bottom rings 48, separating the channels 63 and 65 from the channels 64 and 66, and it will readily be seen that as the rotor moves in the direction of the large arrows, fluid passing into the pumping chamber 46 through the negative channel 64 will be carried by the blades 43 past the abuttals 72 and will discharge into the positive channel 65 and that likewise fluid passing into the pump chamber from the negative channels 63 will be carried past the abuttal 73 and will be discharged into the positive channels 66 and as the channels 65 and 66 both have connections to the outlet port 71, the fluid will flow, as indicated by the arrows in Figure 7, out through the port 71. As the blades 43 pass the dividing abuttals 72 and 73, the fluid will be subjected to a pressure corresponding to the load carried by the motor rotor and the torque of the power or pump rotor and the blades 43 will have no radial movement while under the reacting pressure. The abuttals 72 and 73 and concentric arcs $A^1$—$A^2$ and $B^1$—$B^2$ form the dividing area between the negative and pressure or positive channels, it being understood that the length of the abuttals is slightly in excess of the distance between the blades, thus providing a slight lap. I have indicated the pressure in the fluid in the positive side of the pump by slightly heavier dotted line shading than on the negative side, where the fluid is flowing freely without pressure. From the outlet port 71 the fluid is conducted to the motor rotor through the ports of the regulating valve 75, which will hereinafter be fully described in detail, and from the motor rotor the fluid flows back through other ports in the valve 75 (see Figure 5) to the inlet port 71 in the pump. Referring now to Figures 2, 3, 4 and $4^a$, and the motor section of Figure 1, the concentric areas above described and adjacent abuttals 77, 78, 79 and 80, divide the positive or pressure side of the channels, which here is the intake side, from the negative or discharge side. Outer pressure channels 81 and 82 arranged on opposite sides of the abuttals 77 and 78 (see Figure 3) and discharging into negative channels $81^a$ and $82^a$ respectively as the rotor pistons rotate in the chamber 55, are connected to the inlet port 83, the channel 82 being connected thereto by a passage $83^a$, see dotted lines in Figure 3. Inner pressure channels 84 and 85, discharging into the negative channels $84^a$ and $85^a$ respectively, through the chamber 56, are connected to the inlet port 86. On the opposite side of the rotor disc (see Figures 4 and $4^a$) an outer pressure channel 87 receives fluid through a duct 88 and discharges into the negative channel $87^a$ through the chamber 59. A pressure channel 89 receives fluid from a duct 90 and discharges into a negative fluid channel $89^a$ through the same chamber. The ducts 88 and 90 are connected through a by-pass $88^b$ and receive fluid through the same valve opening (see Figures 1 and 4). Inner pressure channels 91 and 92 both receive fluid from a duct 93 and discharge through the chamber 60 into the negative channels $91^a$ and $92^a$. All the negative or discharge channels communicate with the outlet port 94 leading to the return duct 95 which conducts the discharged fluid through the controlling valve 75 back to the pump section of the device. The valve 75 is a hollow cylinder having internal valve chambers and is mounted in the casing 21 in which it is free to rock, being manually operable by a hand lever 96 having a suitable latch device 97 engaging a quadrant 98 and being adapted to lock the valve in different positions by means of radial notches 99 provided on the periphery of the quadrant 98. The valve 75 (see Figure 5) is provided with heads 100 and 101 making oil-tight connections with cover plates 102 and 103 respectively and is internally divided into two main chambers 104 and 105 by a partition 106. A filling aperture 69 through which fluid may enter to both compartments through ports 69$^a$ and 69$^b$ in the valve 75, which the aperture 69 spans, and also flow from one to the other of the compartments and to all the interior space of the device, is arranged to bridge the partition 106 and is normally closed by a threaded plug 107 after the device has been entirely filled with oil or other transmitting fluid. In the smaller valve chamber 105 is a reversing chamber 108, having ports 109 and 110 (see Figures 10 to 15 and 20 to 22) and in the larger valve chamber 104 is arranged a by-pass chamber 111, connected to the chamber 105 by a port 112. A large port 113 terminates in a bridge 118 and normally connects the valve chamber 105 with the outlet duct 71 from the pump through a port 113$^a$, and is arranged at one end of the valve chamber and provided with a series of progressively arranged steps 114, 115, 116 and 117 in the shell of the valve 75. These steps are arranged to close the ports 83, 88, 86 and 93 in the neutral position shown in Figure 14 and progressively close the ports from communication with the valve chamber 104 and open to the by-pass chamber 111, when the valve 75 is rotated in the direction of the arrows in Figures 10 to 14. A series of stepped reversing ports 114$^a$, 115$^a$, 116$^a$ and 117$^a$ are provided in the shell of the valve 75 a short distance from the steps 114, 115, 116 and 117 and these ports will register with the ports 83, 88, 86 and 93 when the valve 75 is rotated in the reverse direction from the neutral position, as illustrated in Figure 15 and indicated by the arrow in this figure.

As shown in Figure 5, a duct 71$^b$ leads from the inlet duct 71 to the valve chamber 105 under the valve 75 and terminates in a port 119 directly below the reversing chamber 108 in the valve chamber 105. A port 120 (see Figures 10 to 14 and 20) also leads from the valve chamber 105 and is in a position to register with a port 121 that communicates with the common return duct 95 and another port 122 leading from the chamber 105 is in a position to connect the chamber with the duct 70.

In the operation of the device, the pump constantly pumps a predetermined amount of fluid which is dependent upon the speed of the rotor. This fluid may be conducted through the valve 75 to one or any number of the four chambers in the motor or may be by-passed back to the pump without passing through the motor, or it may be passed in the reverse direction to all of the chambers of the motor and back through the valve 75 to the pump. As the fluid pumped by the pump is a constant quantity, it follows that the speed imparted to the motor is directly in proportion to the speed of the fluid and this again is in a direct ratio to the number of channels it is passing through on its way from the pump to the respective chambers of the motor. The valve 75 therefore has six permanent positions corresponding to reverse, neutral, first, second, third and fourth speed, as more particularly illustrated in Figures 20 to 22.

Figure 14:
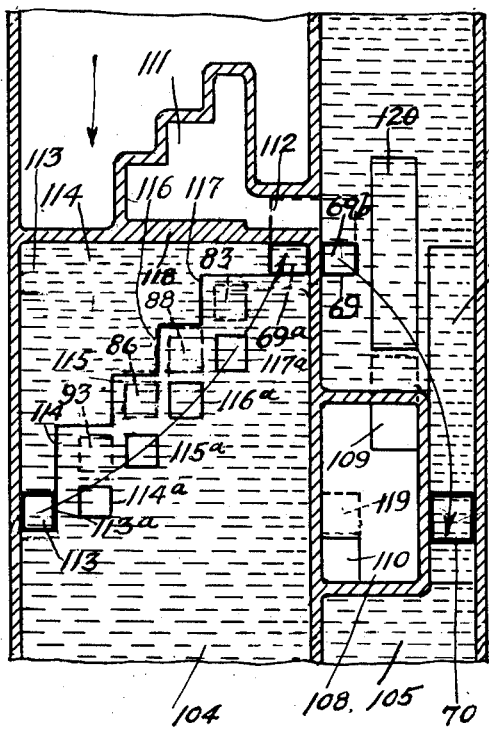
Figure 15:
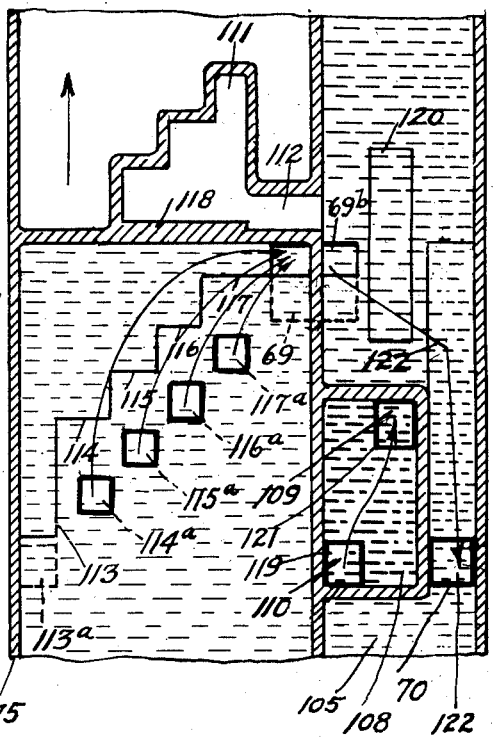

Starting now with the neutral position, as illustrated in Figures 5, 14 and 22, the fluid passes from the pump through the duct 71, ports 113$^a$ and 113, valve chamber 104, port 122, duct 70 and port 70$^a$ to the intake channels of the pump. Manifestly there being no direct connection between the rotor shafts 24 and 25, the motor and the fluid therein will remain inactive, as no fluid under pressure can enter the ducts 83, 88, 86 and 93, the respective ports in the valve 75 all being closed, as indicated in Figure 14. When, however, the valve is advanced in the direction of the arrow to the position shown in Figure 13, the ports 69$^a$ and 69$^b$ are closed and the direct passage of the fluid from the valve chamber 104 to the chamber 105 is barred and it will therefore pass through all of the channels 83, 88, 86 and 93, the ports 114, 115, 116 and 117 leading thereto from the valve chamber 104 now being open. This distributes the fluid pumped by the pump to all of the pressure chambers of the motor in about equal proportions and results in the slowest or fourth highest speed at the motor and having the greatest torque. The entire amount of fluid returns through the duct 95, port 121, valve chamber 105, port 122 and duct 70 to the pump. If now the valve is moved to the position illustrated in Figure 12, the channel 83 is cut off from communication with the valve chamber 104 by the bridge 118 and the same quantity of fluid is pumped only through the remaining three ports, which increases the speed of the fluid and results in the third highest speed of the motor. In the diagrammatical views 17 and 18, I have indicated the four motor chambers by circles 55, 56, 59 and 60, and numerals 1, 2, 3 and 4, corresponding to the speed ratio obtained when the chambers are brought out of positive operation successively from left to right by the adjustment of the valve 75. When, therefore, these chambers are caused to have negative operation only, the fluid remaining therein must have free circulating flowage in order to prevent a braking effect on the rotor and when the valve 75 is rotated in the direction of the arrow, in Figure 12, the by-pass chamber 111 comes in register with the channel 83 having communication with the motor chamber 55 and the fluid then at once begins the auxiliary circulation, as indicated by the arrow Y, through the outlet duct 95 from the motor, through the port 121, chamber 105, port 112, bypass chamber 111, channel 83 back to the motor chamber 55, without passing through the pump.

Figure 11 shows the developed cylindrical shell and ports of the valve in relation to the stationary ports when the valve has been moved to the second high speed position in which the ports 83 and 88 are closed for positive and open for negative or auxiliary circulation through the motor chambers 55 and 59.

In Figures 1 and 10, the channels 83, 88 and 86 and motor chambers 55, 56 and 59, are closed to positive and open for negative circulation, resulting in the first or highest speed of the motor when only the channel 93 and chamber 60 are open for positive circulation, and all the fluid pumped passes through this chamber. The circulation of the fluid for this speed is that graphically shown in Figure 18 and the circulation of the fluid for the lowest speed is that shown in Figure 17. The valve 75 is moved to the different positions corresponding to the speeds, as indicated in Figures 20 to 22, by means of the lever 96, which is locked in the notches 99.

When it is desired to reverse the direction of the motor rotor, the lever is brought back past the neutral and into the reversed position indicated at R. The relative position of the various valve and channel ports and flow of the fluid through the valve is illustrated in Figure 15. As here shown, the normal inlet port 113 to the valve chamber 104 is closed by the valve shell from communication with the port 113ª and outlet duct 71 receiving fluid from the pump and the port 119 and common port 121 are open to the reversing chamber 108 through the valve ports 110 and 109. The fluid from the pump passing out through the outlet port 71 is now forced to pass through the duct 71ᵇ, port 110, chamber 108, port 109 to the port 121 and duct 95. As the duct 95 normally acts as a return passage to the valve 75 from all the chambers of the motor it will be seen that the fluid coming from the pump passes through this duct in a reverse direction and will therefore operate in all the chambers to reverse the direction of the motor rotor. The fluid will therefore return to the valve 75 through the channels 83, 88, 86 and 93 and will pass through the ports 114ª, 115ª, 116ª and 117ª into the valve chamber 104 and through the ports 113 and 69 and 69ᵇ into the valve chamber 105 and from thence through the port 122 into the inlet port 70 to the pump.

In Figure 19 I have illustrated a modified form of the variable fluid transmission as applied direct to the driving axle of an automotive vehicle, and dispensing with the usual compensating gearing, the device automatically compensating for variable speed of the driving wheels or axles. As here indicated, two motor or driven rotors are mounted in casings 125 and 126, a motor being connected to each one of the axles 127 and 128. The pump rotor 129 is directly connected to the driving shaft 130 and all the rotors are preferably secured to the main casing 131 in which is also mounted the controlling valve 132. A lever 133 is rigidly connected to the valve stem 134 and an operating rod 135 is pivotally connected to the lever 133 by means of which the valve may be operated from the driver's seat. The circulation of the fluid is in the main as above described and as indicated by the arrows, from the pump 129 through a duct 136, to the valve 132, from the valve to any one of the chambers in the two motors through ducts 137 and 138 and through the common return duct 139 and valve through the return duct 140, to the pump. It will readily be seen that the fluid will distribute itself automatically to the two motors in a proportion corresponding to the speed required by the axles of the vehicles, as both of these motors are constantly receiving fluid from the pump, thereby automatically compensating for the unequal speed of the two axles or wheels.

In order to establish an effective tight-joint or working seal between the radially actuated blades in the various pump and motor chambers and the circular walls of the chambers, on account of the varying radial angle of the blades relative to the outer and inner walls of the chambers, as the blades rotate eccentrically to the axis of the rotor, I prefer to construct the blades of a plurality of plates 141, as more particularly shown in Figure 16. These plates have slightly rounded inner and outer ends 142 and 143 bearing against the eccentric walls 144 and 145 of the chambers, thereby compensating for the inequality of the radial alinement and preserving a tight working joint at all points in the cycle.

Referring again to Figures 5, 14 and 22, where the valve 75 is shown in the neutral position and the motor channels 83, 88, 86 and 93 are closed from communication with the valve chamber 104, it will readily be seen that the fluid remaining in this chamber and channels is barred from circulation and that therefore, while the driving rotor may rotate freely, the driven rotor blades are absolutely locked against either forward or backward movement. In the practical operation of the transmission for automotive purposes, it is often desirable for the operator to be enabled to make the power and motor rotors run independently of each other, as for instance, when coasting or towing a car or speeding the engine without wishing to increase the speed of the car, and as this obviously can not be done either with the valve 75 in the neutral position, I provide a small auxiliary valve 146 (see Figures 5, 9 and 20) having a port 147 that may effect communication between the duct 71ᵇ and inlet port 70, through ports 148 and 149. Normally this valve is closed but when it is desired to operate the two rotors independently, the valve is turned by means of a suitable lever 150 to open for the flow of fluid from the pump through the port 71, duct 71ᵇ, valve port 147 and port 70 back to the pump. The circulation of fluid caused by the independent rotation of the motor rotor will then be through any of the ports 83, 88 or 86 that may be open to the by-pass chamber 111 and from thence through the port 112, valve chamber 85, port 121, duct 95 and corresponding motor chambers.

From the foregoing description it will be seen that besides the transmission construction being simple and of few parts, the torque increases with the decrease in speed, that the pressure against the rotor discs is balanced by the equal pressure on the blades on both sides of the discs and that the blades have no sliding radial movement in the rotor flanges while subjected to pressure, thereby eliminating undue strain and friction on the operating parts and that the rotors are both in static and running balance by reason of the opposite eccentricity of the rotating ports and furthermore, that the control of the transmission and shifting to the various speeds is exceedingly simple, easy and effective of operation.

It will be understood that various modifications in the construction and proportion of the device may be made without affecting the principle and scope of the invention; for example, while I have shown a rotary controlling valve, in practice I purpose to use a pressure balanced valve member of any suitable form and I do not, therefore, limit my claims to the details of construction shown.

I claim as my invention:

1. In a variable speed fluid transmission, a fluid pressure pump, a motor comprising a disc having an annular flange parallel substantially with the axis of said disc and having a plurality of blades mounted to move radially in said flange and actuated by said fluid pressure pump, means for varying the number of blades affected by the fluid pressure and controlling the distribution of the fluid pressure.

2. In a variable speed fluid transmission, a fluid pressure pump, a motor comprising a disc having an annular flange projecting from opposite sides thereof and having a plurality of blades mounted to move radially in said flanges and balance the pressure on said disc and actuated by said fluid pressure pump, and means for varying the number of blades affected by the fluid pressure and for controlling the distribution of the fluid pressure to said blades.

3. In a variable speed fluid transmission, a fluid pressure pump, a motor comprising a revolving disc having a plurality of radial blades upon opposite sides of said disc and actuated by said fluid pressure pump, and means for varying the number of blades affected by the fluid pressure and for controlling the distribution of the fluid pressure to said blades.

4. In a power transmitting device, the combination, with a fluid pressure pump having an inlet and outlet port and a fluid pressure motor having a plurality of chambers and a disc having radially moving pistons upon opposite sides thereof, of a controlling valve having a main chamber for connection with the outlet port from the pump and a return chamber for connection with the inlet port to said pump, means for connecting the main valve chamber with a predetermined number of said motor chambers, and the outlet port from said pump, a fluid return channel connected to all of the chambers in said motor and means for connecting the return valve chamber to said return channel and the inlet port of said pump.

5. In a fluid pressure transmission device, the combination, with a fluid pressure pump, of a fluid pressure motor having a plurality of annular chambers and a disc and pistons radially movable upon opposite sides thereof, a valve and channels controlled by said valve for distributing fluid under pressure through a predetermined number of said chambers and returning the fluid to said pump, and channels controlled by said valve for reversing the direction of flow of fluid through said chambers.

6. In a fluid pressure transmission device, the combination with a fluid pressure pump and a fluid pressure motor actuated by the pump and comprising a disc and blades radially movable in guides on opposite sides thereof and adapted to balance the pressure on opposite sides of said disc, of a valve for controlling the flow of fluid between said pump and motor and having a distributing chamber and ports communicating with said motor, said valve also having a return flow chamber through which the fluid may return to said pump, and a passage controlled by said valve for cutting off flow of fluid to the motor and effecting direct circulation through both of said chambers and said pump.

7. In a fluid pressure transmission device, the combination with a fluid pressure pump and a fluid pressure motor actuated by said pump and comprising a disc and radially movable blades upon opposite sides thereof to equalize the pressure and balance said disc, of a valve controlling the flow of fluid between said pumps and motor, said valve having a distributing chamber and ports controlling the flow of fluid to said motor, a return flow chamber in said valve through which the fluid returns to said pump and said valve having a by-pass chamber through which fluid may circulate from the motor to the return flow chamber and back to the motor independent of the circulation through said pump.

8. A fluid pressure transmission device comprising a pump having fluid pressure outlets, a motor comprising a disc and a plurality of radially moving blades arranged on opposite sides of the disk and adapted to balance the pressure on opposite sides of said disc, a controlling valve for distributing the pressure fluid from said pump to said motor, means for returning the fluid from said motor to said pump, and an auxiliary valve for returning the fluid from the pressure outlet of said pump to the intake of said pump independently of the passage through said controlling valve or said motor.

9. A fluid pressure transmission device comprising a pump having fluid pressure outlets and radially moving blades, a motor comprising a disc having annular flanges and balanced blades radially movable therein, a controlling valve for distributing the pressure fluid from said pump to said motor, and means for checking the flow of the fluid from said motor to said pump.

10. A transmission device comprising a pump having a disc provided with radially moving blades and eccentrically arranged passages wherein said blades operate, a motor and a disc therefor and radially moving blades operating in guides in said disc, the blades of said pump and motor discs being arranged on both sides of the disks to equalize the pressure and balance said discs, a controlling valve interposed between said pump and motor for controlling the speed and torque of said motor, and means for obstructing the flow of the exhaust of said motor to provide a braking action therein.

11. A transmission device comprising a pump including a disc having radially moving blades slidable in guides on one side thereof, a casing having eccentric passages wherein said pistons operate, a motor arranged to receive the fluid from said pump and having blades slidable in guides upon opposite sides thereof, a controlling valve interposed between said pump and said motor, and an auxiliary valve for returning the fluid from the outlet port of said pump to the inlet port of said pump independently of said controlling valve and of said motor.

12. A fluid pressure transmission device comprising a pump disc having radially moving blades on opposite sides slidable in guides thereon, a casing having eccentric passages wherein said blades operate, a motor arranged to receive the fluid from said pump and also comprising a disk having blades on opposite sides slidable in guides thereon and engaging said eccentric passages, and a controlling valve interposed between said pump and motor for diverting the fluid pressure stream to vary the speed, torque, and direction of rotation of said motor.

13. A transmission device comprising a pump including a disc having radially moving blades on opposite sides slidable in guides thereon, a motor arranged to receive the fluid from said pump and also comprising a disk having blades on opposite sides slidable in guides thereon, a casing for said discs having eccentric passages wherein said blades operate radially with respect to said discs, the arrangement of said blades being adapted to balance the pressure on said discs, means for regulating the flow of fluid between said pump and motor and for selectively controlling flow to any set of blades, and a passage for conducting the fluid pressure directly from the outlet port of said pump to the inlet port thereof.

14. A transmission device comprising a pump including a disc having radially moving blades on opposite sides slidable in guides thereon, a motor arranged to receive the fluid from said pump and also including a disc having blades on opposite sides slidable in guides thereon, a casing for said discs having eccentric passages wherein said blades operate radially with respect to said discs, a controlling valve for regulating the speed, torque, and direction of rotation of said motor, means for checking the flow of the exhaust pressure from said motor, and a passage for returning the fluid from the discharge of said pump to its intake port independently of said controlling valve.

15. A fluid transmission device comprising a fluid pressure pump having a disc and radially moving blades upon opposite sides thereof, a motor having a disc and radially moving blades thereon, a casing for said fluid transmission having eccentric passages wherein said blades operate, said pump and motor each having a plurality of intake and exhaust ports and a controlling valve for distributing the fluid pressure from said pump to said motor for varying the speed and torque thereof, and said valve being also adapted for reversing the direction of rotation of said motor.

In witness whereof, I have hereunto set my hand this 20th day of December, 1920.

EDWIN G. STAUDE.